US008243862B2

(12) United States Patent
Liu et al.

(10) Patent No.: US 8,243,862 B2
(45) Date of Patent: Aug. 14, 2012

(54) RECEIVER AND SIGNAL RECEIVING METHOD THEREOF

(75) Inventors: Jia-Wei Liu, Jhongli (TW); Chorng-Ren Sheu, Kaohsiung (TW); Chuan-Yuan Huang, Qieding Township, Kaohsiung County (TW)

(73) Assignee: Industrial Technology Research Institute, Hsinchu (TW)

( * ) Notice: Subject to any disclaimer, the term of this patent is extended or adjusted under 35 U.S.C. 154(b) by 48 days.

(21) Appl. No.: 13/029,587

(22) Filed: Feb. 17, 2011

(65) Prior Publication Data
US 2012/0121002 A1   May 17, 2012

(30) Foreign Application Priority Data
Nov. 15, 2010   (TW) ............................... 99139247 A

(51) Int. Cl.
*H03D 1/04*   (2006.01)
*H04B 1/10*   (2006.01)
(52) U.S. Cl. ................... 375/346; 375/260; 375/267
(58) Field of Classification Search .............. 375/260, 375/267, 229–236, 346–350
See application file for complete search history.

(56) References Cited

U.S. PATENT DOCUMENTS

| | | | |
|---|---|---|---|
| 7,403,571 B2 | 7/2008 | Jeon et al. | |
| 7,483,364 B2 | 1/2009 | Jeon et al. | |
| 7,620,128 B2 | 11/2009 | Naguib et al. | |
| 2004/0185792 A1* | 9/2004 | Alexiou et al. | 455/69 |
| 2008/0095039 A1* | 4/2008 | Joo et al. | 370/210 |

FOREIGN PATENT DOCUMENTS

| | | |
|---|---|---|
| TW | 200608727 | 3/2006 |
| TW | 200830070 | 7/2008 |

OTHER PUBLICATIONS

English language translation of abstract of TW 200608727 (published Mar. 1, 2006).
English language translation of abstract of TW 200830070 (published Jul. 16, 2008).
Wee, J.W., et al.; "Successive Interference Cancellation for STBC-OFDM Systems in a Fast Fading Channel," IEEE; 2005; pp. 1-4.
Lee, K.I., et al.; "Computationally Efficient Signal Detection for STBC-OFDM Systems in Fast-Fading Channels;" The 8th Annual IEEE Symposium on Personal, Indoor and Mobile Radio Communication; 2007; pp. 1-5.
Tso, C.Y., et al.; "Iterative Interference Cancellation for STBC-OFDM Systems in Fast Fading Channels;" IEEE; 2009; pp. 1-5.

(Continued)

*Primary Examiner* — Curtis Odom
(74) *Attorney, Agent, or Firm* — Thomas|Kayden

(57) ABSTRACT

A signal receiving method of a receiver includes following steps. Multiple time-domain received signals are transformed into multiple frequency-domain received signals, and channel response matrices corresponding to the frequency-domain received signals are estimated. The frequency-domain received signals are STBC decoded and multiple original combination signals are obtained based on the corresponding channel response matrices. The frequency-domain received signals are rearranged, and the rearranged frequency-domain received signals are STBC decoded and multiple rearrangement combination signals are obtained based on the corresponding channel response matrices. The original combination signals and the rearrangement combination signals are randomly chosen and summed to obtain multiple complex signals. The complex signal with minimum interference power is selected and then the selected signal is used to cancel interference and compensate the channel effect to obtain the detected data.

10 Claims, 7 Drawing Sheets

OTHER PUBLICATIONS

Lin, D.B., et al.; Performance Analysis of Two-Branch Transmit Diversity Block-Coded OFDM Systems in Time-Varying Multipath Rayliegh-Fading Channels; IEEE Transactions on Vehicular Technology; vol. 54; No. 1; Jan. 2005; pp. 136-148.

Chiang, P.H., et al.; "Performance Analysis of Alamouti 2IM0 Diversity System in Time-Varying Rayleigh Fading Channels;" IEEE; 2006; pp. 1-6.

"Digital Video Broadcasting (DVB): Frame Structure Channel Coding and Modulation for a Second Generation Digital Terrestrial Television Broadcasting System (DVB-T2);" European Standard (Telecommunications Series); ETSI EN 302 755 V1.11; 2009; pp. 1-167.

"Part 16: Air Interface for Fixed and Mobile Broadband Wireless Access Systems; Amendment 2: Physical and Medium Access Control Layers for Combined Fixed and Mobile Operation in Licensed Bands;" IEEE Standard for Local and Metropolitan Area Networks; 2006; pp. 1-864.

"3rd Generation Partnership Project: Technical Specification Group Radio Access Network; Evolved Universal Terrestrial Radio Access (E-UTRA); Physical Channels and Modulation;" Technical Specification; 3GPP TS 36.211; 2010; pp. 1-85.

* cited by examiner

RECEIVER AND SIGNAL RECEIVING METHOD THEREOF

This application claims the benefit of Taiwan application Serial No. 99139247, filed Nov. 15, 2010, the subject matter of which is incorporated herein by reference.

TECHNICAL FIELD

The invention relates in general to a receiver and a signal receiving method thereof.

BACKGROUND

In a wireless communication system, a transmitter transmits wireless signals to a receiver through a physical channel, such as air, in the form of electromagnetic waves. Due to the non-ideal channel effect, such as multi-path reflection and multi-path fading, the wireless signals received by the receiver may get distorted.

Based on the orthogonal frequency division multiplexing (OFDM) modulation technology for the multi-carrier modulation, the effective processing ability is obtained with respect to the multi-path reflection effect. In the OFDM systems, the receiver only needs one simple one-tap equalizer to equalize the frequency selective fading effect, which is caused by time invariant multi-path channel. So, the OFDM system has recently become the mainstream technology in the communication field and the broadcasting application development.

For the previous wireless communication system, multi-path signals are assumed to be useless even harmful. However, characteristics of multi-path propagating are efficiently utilized to improve throughput, transmission distance/coverage and reliability in a multi-transmitting multi-receiving antenna system applying a multi-input multi-output (MIMO) technique. Thus, the MIMO technique has recently become another popular technology.

Therefore, a new MIMO OFDM system is developed. The MIMO OFDM system can be classified into techniques capable of improving the transmission distance/coverage and reliability, such as a space time block code (STBC) technique, and techniques capable of improving the data transmission throughput, such as a Bell Labs Layered Space-Time (BLAST) technique. So, the MIMO OFDM system has recently become the mainstream technology in the wireless communication application development. Various systems, such as the wireless local area network (WLAN) 802.11n, the European standard digital video broadcasting-terrestrial 2 (DVB-T2), and the Wi-Max IEEE 802.16e/802.16m and the $3^{rd}$ generation partnership project (3GPP) long term evolution (LTE)/long term evolution-advanced (LTE-A) with the mobility apparatus, uses the MIMO OFDM transmission technology.

Nowadays, receivers of some MIMO OFDM systems (e.g., WLAN 802.11n, DVB-T2, IEEE 802.16e/802.16m, 3GPP LTE/LTE-A and the like) are emphasized to provide desirable receiving capability at the high-speed motion. However, the receiver of the MIMO OFDM system will suffer problems as described below when the STBC technique is applied. A received signal from each receiving antenna is a composition signal of all transmitted signals from the transmitting antennas as the MIMO technique is applied. The demodulation of one of the received signals will be interfered with the transmitted signals from all the other transmitting antennas, thereby causing the co-channel interference (CCI). The above problem is usually overcome by the orthogonal characteristic of the STBC coding technique. However, when the receiver is moved at the high speed relatively to the transmitter, the fast variation of the channel will enhance the CCI, so that the orthogonal characteristic the STBC coding technique provided is no longer kept, thereby causing the detection of the received signals easily making mistakes and the performance of the system degraded.

In addition, when the receiver of the MIMO OFDM system is not stationary and is moved at the high speed relatively to the transmitter, the channel in the duration of one OFDM useful symbol is no longer kept in the fixed state, thereby causing the time-selective fading channel. Due to the influence of the Doppler effect at the high-speed motion, the OFDM signal is positively or negatively offset by one time of Doppler frequency ($f_d$) with the center carrier frequency ($f_c$) serving as the center. This offset is unfavorable to a multi-carrier modulation system, and may cause an inter-carrier interference (ICI) effect that destroys the orthogonality of the sub-carriers, hence resulting in an error floor phenomenon in the performance of bit error rate (BER).

A CCI cancellation method is disclosed in U.S. Pat. No. 7,403,571 B2. A receiver estimates channel responses of different transmitting antennas and receiving antennas at different time, and calculates gains of channel responses. Thereafter, the receiver selects a received signal with a better channel response gain to perform data detection, and then utilizes the detected data to reconstruct and cancel the CCI term of the received signal with a worse channel response gain to perform data detection for the other transmitted data. Since the CCI term is reconstructed by the detected data, the insufficient reliability of the detected data will degrade the performance of the CCI cancellation method. Besides, neglect of the reconstruction and cancellation of the ICI term will also degrade the overall system performance.

Proc. of IEEE GLOBECOM, PP. 1-5, 2009, discloses a CCI and ICI reconstruction and cancellation method. In this article, a recursive manner is provided to cooperate with the CCI and ICI interference cancellation method to suppress the CCI and ICI effect of the STBC OFDM system. The method presets a number of recursion at the receiver, estimates channel responses of different transmitting antennas and receiving antennas at different time, and then calculates gains of channel responses. Thereafter, the receiver selects the received signal with a better channel response gain to perform data detection, and then utilizes the detected data to reconstruct and cancel the CCI term of the received signal with a worse channel response gain to perform data detection for the other transmitted data. Then, the receiver determines whether the number of recursion is exceeded. If the number of recursion is not exceeded, the reconstruction and cancellation of the ICI term of the received signal is performed, and the reconstruction and cancellation of the CCI term is repeatedly according to the above steps until the preset number of recursion is achieved. Although the method considers the ICI terms and enhances the reliability of data detection by the recursive manner, the recursive manner may cause the complexity of overall computation to be raised and the operation processing speed to be slower.

A zero-forcing equalizer is provided in U.S. Pat. No. 7,483,364 B2. A receiver estimates channel responses of different transmitting antennas and receiving antennas at different time, and forms channel response matrices corresponding to the received signals. Then, the zero-forcing equalization technique is utilized to perform an inverse matrix operation to compensate channel effect, including the influence of CCI. However, assume the number of the transmitting antennas is M, the zero-forcing equalizer needs to perform the inverse matrix operation with the matrix size of M×M, and $O(M^3)$ complex multiplication operations are needed. As the value of M is very large, the complexity of hardware implementation is too high.

SUMMARY

According to the exemplary embodiment, a receiver is provided. The receiver includes a demodulation unit, a channel estimator, a first space time block code (STBC) decoder, a second STBC decoder, a complex signal generator and an interference cancellation and channel equalization unit. The demodulation unit transforms multiple time-domain received signals into multiple frequency-domain received signals. The channel estimator estimates channel responses corresponding to the frequency-domain received signals to form corresponding channel response matrices. The first STBC decoder performs STBC decoding on the frequency-domain received signals and obtains multiple original combination signals based on the corresponding channel response matrices. The second STBC decoder rearranges the frequency-domain received signals, and performs STBC decoding on the rearranged frequency-domain received signals and obtains multiple rearrangement combination signals based on the corresponding channel response matrices. The complex signal generator randomly chooses and sums the original combination signals and the rearrangement combination signals to obtain multiple complex signals. The interference cancellation and channel equalization unit selects one of the complex signals to be used to cancel interference and compensate channel effect to obtain detected data.

Besides, a signal receiving of a receiver including the following steps is provided. Multiple time-domain received signals are transformed into multiple frequency-domain received signals, and channel responses corresponding to the frequency-domain received signals are estimated to form corresponding channel response matrices. The first STBC decoding is performed on the frequency-domain received signals and multiple original combination signals are obtained based on the corresponding channel response matrices. The frequency-domain received signals are then rearranged, and the second STBC decoding is performed on the rearranged frequency-domain signals and multiple rearrangement combination signals are obtained based on the corresponding channel response matrices. The original combination signals and the rearrangement combination signals are chosen and summed randomly to obtain multiple complex signals. One of the complex signals is selected to be used to cancel interference and compensate channel effect to obtain detected data.

The invention will become apparent from the following detailed description of the preferred but non-limiting embodiments. The following description is made with reference to the accompanying drawings.

DETAILED DESCRIPTION

The disclosure provides a receiver and a signal receiving method thereof, capable of applying to a multi-input multi-output (MIMO) orthogonal frequency division multiplexing (OFDM) system, but it is not limited thereto. Frequency-domain received signals are rearranged, decoded by a space time block code (STBC) technique to obtain the multiple rearrangement combination signals, and then the combination signals are chosen and summed randomly to obtain multiple complex signals in conjunction with selection rules of different estimating measurements to find out a better complex signal to perform interference reconstruction and cancellation operations and channel effect compensation to obtain detected data. The calculation is simple and the performance of the MIMO OFDM system in the high-speed motion environment is effectively enhanced.

Figure 1:
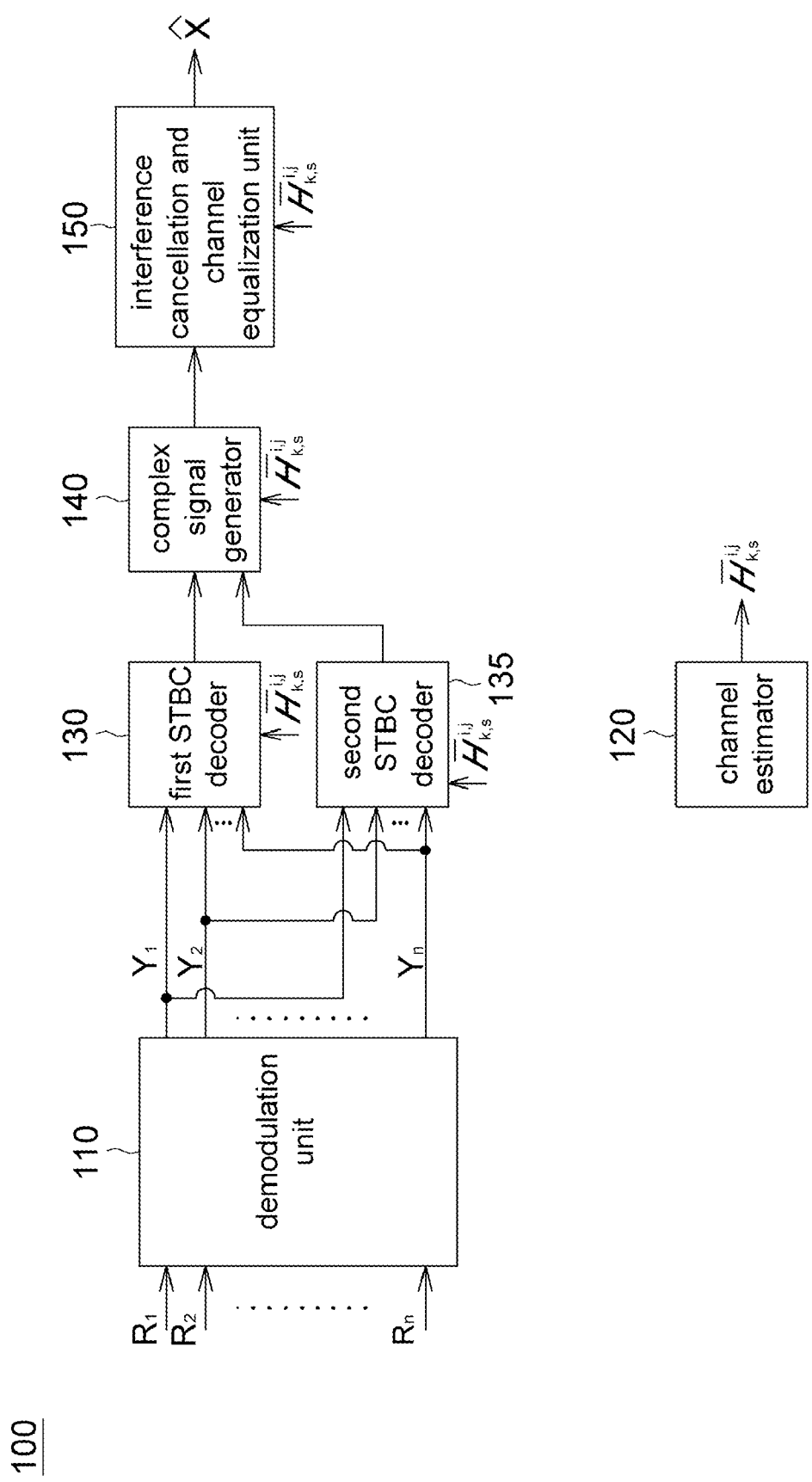
FIG. 1 shows a block diagram illustrating a MIMO OFDM receiver according to an embodiment.

Referring to FIG. 1, a block diagram illustrating a MIMO OFDM receiver according to an embodiment is shown. The MIMO OFDM receiver 100 includes a demodulation unit 110, a channel estimator 120, a first STBC decoder 130, a second STBC decoder 135, a complex signal generator 140 and an interference cancellation and channel equalization unit 150. The MIMO OFDM receiver 100 receives n time-domain received signals $R_1 \sim R_n$ from n receiving antennas. The demodulation unit 110 transforms the n time-domain received signals $R_1 \sim R_n$ into n frequency-domain received signals $Y_1 \sim Y_n$. The channel estimator 120 estimates channel responses $\overline{H}_{k,s}^{i,j}$, corresponding to the frequency-domain received signals $Y_1 \sim Y_n$ to form corresponding channel response matrices $H_1 \sim H_n$. $\overline{H}_{k,s}^{i,j}$ is the channel response of the $j^{th}$ transmitting antenna to the $i^{th}$ receiving antenna at the $k^{th}$ sub-carrier and the $s^{th}$ OFDM symbol.

The first STBC decoder 130 performs STBC decoding on the frequency-domain received signals $Y_1 \sim Y_n$ and obtains multiple original combination signals based on the corresponding channel response matrices. The second STBC decoder 135 rearranges the frequency-domain received signals $Y_1 \sim Y_n$, and performs STBC decoding on the rearranged frequency-domain received signals and obtains multiple rearrangement combination signals based on the corresponding channel response matrices. The complex signal generator 140 randomly chooses and sums the original combination signals and the rearrangement combination signals to obtain multiple complex signals. The interference cancellation and channel equalization unit 150 selects one of the complex signals with the minimum interference to be used to cancel interference and compensate channel effect to obtain detected data $\hat{X}$.

Figure 2:
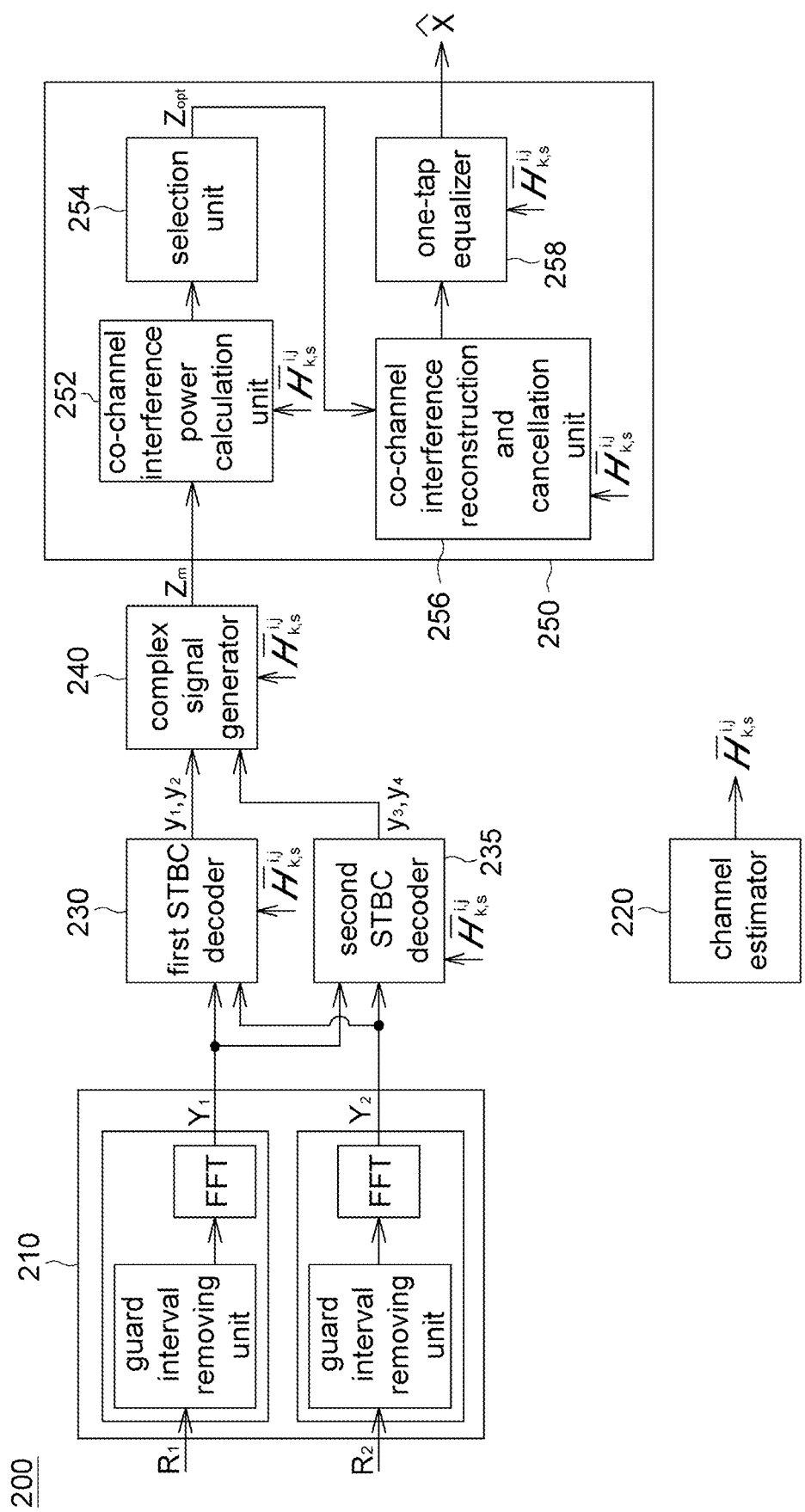
FIG. 2 shows a block diagram illustrating one example of a MIMO OFDM receiver applying a one-tap equalizer according to the embodiment.

In this non-restrictive example, the MIMO OFDM receiver applies a one-tap equalizer under a 2×2 STBC OFDM architecture. Referring to FIG. 2, a block diagram illustrating one example of a MIMO OFDM receiver applying a one-tap equalizer according to the embodiment is shown. Guard intervals of the time-domain received signals $R_1 \sim R_2$ from the two receiving antennas are removed by the demodulation unit 210, and then the frequency-domain received signal $Y_1$ from the first receiving antenna and the frequency-domain received signal $Y_2$ from the second receiving antenna are obtained via Fast Fourier Transform (FFT). The frequency-domain received signal $Y_i$ from the $i^{th}$ receiving antenna is shown as the equation (1), wherein i represents the $i^{th}$ receiving antenna, k represents the $k^{th}$ sub-carrier, and s represents the $s^{th}$ OFDM symbol.

$$Y_i = [Y_{k,s}{}^i, (Y_{k,s+1}{}^i)^*]^T \quad (1)$$

where $Y_{k,s}{}^i = \overline{H}_{k,s}{}^{i,1} X_{k,s}{}^1 + \overline{H}_{k,s}{}^{i,2} X_{k,s}{}^2 + I_{k,s}{}^i + W_{k,s}{}^i$ for $k=0 \sim N-1$, N is the size of FFT.

In the equation (1), $\overline{H}_{k,s}{}^{i,j}$ represents the channel response of the $j^{th}$ transmitting antenna to the $i^{th}$ receiving antenna at the $k^{th}$ sub-carrier and the $s^{th}$ OFDM symbol; $X_{k,s}{}^j$ represents the frequency-domain transmitted signal of the $j^{th}$ transmitting antenna at the $k^{th}$ sub-carrier and the $s^{th}$ OFDM symbol; $I_{k,s}{}^i$ represents the inter-carrier interference (ICI) of the $i^{th}$ receiving antenna at the $k^{th}$ sub-carrier and the $s^{th}$ OFDM symbol; $W_{k,s}{}^i$ represents the additive white Gaussian noise of the $i^{th}$ receiving antenna at the $k^{th}$ sub-carrier and the $s^{th}$ OFDM symbol. Each frequency-domain received signal includes an data detection term ($\overline{H}_{k,s}{}^{i,j} X_{k,s}{}^j$, i=j), a co-channel interference (CCI) term ($\overline{H}_{k,s}{}^{i,j} X_{k,s}{}^j$, i≠j), an inter-carrier interference (ICI) term $I_{k,s}{}^i$ and an additive white Gaussian noise term $W_{k,s}{}^i$.

The channel estimator 220 estimates the channel responses $\overline{H}_{k,s}{}^{i,j}$ corresponding to the frequency-domain received signals $Y_i$ to form corresponding channel response matrices. The first STBC decoder 230 firstly generates corresponding channel response matrices $H_1 \sim H_2$ and the frequency-domain received signals $Y_1 \sim Y_2$, shown as the equations (2) and (3).

$$Y_1 = H_1 X + I_1 + W_1 \quad (2)$$
where
$$Y_1 = \begin{pmatrix} Y_{k,s}^1 \\ (Y_{k,s+1}^1)^* \end{pmatrix}, H_1 = \begin{pmatrix} \overline{H}_{k,s}^{1,1} & \overline{H}_{k,s}^{1,2} \\ (\overline{H}_{k,s+1}^{1,2})^* & (-\overline{H}_{k,s+1}^{1,1})^* \end{pmatrix},$$
$$X = \begin{pmatrix} X_{k,s}^1 \\ X_{k,s}^2 \end{pmatrix}, I_1 = \begin{pmatrix} I_{k,s}^1 \\ (I_{k,s+1}^1)^* \end{pmatrix}, \text{ and } W_1 = \begin{pmatrix} W_{k,s}^1 \\ (W_{k,s+1}^1)^* \end{pmatrix}$$

$$Y_2 = H_2 X + I_2 + W_2 \quad (3)$$
where
$$Y_2 = \begin{pmatrix} Y_{k,s}^2 \\ (Y_{k,s+1}^2)^* \end{pmatrix}, H_2 = \begin{pmatrix} \overline{H}_{k,s}^{2,1} & \overline{H}_{k,s}^{2,2} \\ (\overline{H}_{k,s+1}^{2,2})^* & (-\overline{H}_{k,s+1}^{2,1})^* \end{pmatrix},$$
$$X = \begin{pmatrix} X_{k,s}^1 \\ X_{k,s}^2 \end{pmatrix}, I_2 = \begin{pmatrix} I_{k,s}^2 \\ (I_{k,s+1}^2)^* \end{pmatrix}, \text{ and } W_2 = \begin{pmatrix} W_{k,s}^2 \\ (W_{k,s+1}^1)^* \end{pmatrix}$$

Then the frequency-domain received signals $Y_1$ and $Y_2$ are respectively combined with corresponding channel response matrices $H_1$ and $H_2$ to obtain multiple original combination signals $y_1$ and $y_2$, as shown in the equations (4) and (5).

$$y_1 = H_1^H Y_1 = H_1^H H_1 X + H_1^H (I_1 + W_1) \quad (4)$$

$$y_2 = H_2^H Y_2 = H_2^H H_2 X + H_2^H (I_2 + W_2) \quad (5)$$

The second STBC decoder 235 firstly rearranges the frequency-domain received signals $Y_1$ and $Y_2$ to obtain rearranged frequency-domain received signals $Y_3$ and $Y_4$ and generates corresponding channel response matrices $H_3 \sim H_4$, shown as the equations (6) and (7).

$$Y_3 = H_3 X + I_3 + W_3 \quad (6)$$
where
$$Y_3 = \begin{pmatrix} Y_{k,s}^1 \\ (Y_{k,s+1}^2)^* \end{pmatrix}, H_3 = \begin{pmatrix} \overline{H}_{k,s}^{1,1} & \overline{H}_{k,s}^{1,2} \\ (\overline{H}_{k,s+1}^{2,2})^* & (-\overline{H}_{k,s+1}^{2,1})^* \end{pmatrix},$$
$$X = \begin{pmatrix} X_{k,s}^1 \\ X_{k,s}^2 \end{pmatrix}, I_3 = \begin{pmatrix} I_{k,s}^1 \\ (I_{k,s+1}^2)^* \end{pmatrix}, \text{ and } W_3 = \begin{pmatrix} W_{k,s}^1 \\ (W_{k,s+1}^2)^* \end{pmatrix}$$

$$Y_4 = H_4 X + I_4 + W_4 \quad (7)$$
where
$$Y_4 = \begin{pmatrix} Y_{k,s}^2 \\ (Y_{k,s+1}^1)^* \end{pmatrix}, H_4 = \begin{pmatrix} \overline{H}_{k,s}^{2,1} & \overline{H}_{k,s}^{2,2} \\ (\overline{H}_{k,s+1}^{1,2})^* & (-\overline{H}_{k,s+1}^{1,1})^* \end{pmatrix},$$
$$X = \begin{pmatrix} X_{k,s}^1 \\ X_{k,s}^2 \end{pmatrix}, I_4 = \begin{pmatrix} I_{k,s}^2 \\ (I_{k,s+1}^1)^* \end{pmatrix}, \text{ and } W_4 = \begin{pmatrix} W_{k,s}^2 \\ (W_{k,s+1}^1)^* \end{pmatrix}$$

Then the rearranged frequency-domain received signals $Y_3$ and $Y_4$ are respectively combined with corresponding channel response matrices $H_3$ and $H_4$ to obtain multiple rearrangement combination signals $y_3$ and $y_4$, as shown in the equations (8) and (9).

$$y_3 = H_3^H Y_3 = H_3^H H_3 X + H_3^H (I_3 + W_3) \quad (8)$$

$$y_4 = H_4^H Y_4 = H_4^H H_4 X + H_4^H (I_4 + W_4) \quad (9)$$

The complex signal generator 240 randomly chooses and sums the original combination signals $y_1$ and $y_2$ and the rearrangement combination signals $y_3$ and $y_4$ to obtain multiple complex signals $Z_m$, wherein any number of $y_1$ to $y_4$ may be selected to be summed to obtain multiple complex signals $Z_m$. The interference cancellation and channel equalization unit 250 selects one of the complex signals with the minimum interference to perform interference reconstruction and cancellation operations and channel effect compensation. Due to the interference cancellation and channel equalization unit 250 applies a one-tap equalizer, the influence of the CCI term is far larger than the influence of the ICI term, thus the interference cancellation and channel equalization unit 250 takes the CCI term with the minimum power as the selection rule of the estimating measurement.

As shown in FIG. 2, the interference cancellation and channel equalization unit 250 includes a CCI power calculation unit 252, a selection unit 254, a CCI reconstruction and cancellation unit 256 and a one-tap equalizer 258. The CCI power calculation unit 252 calculates CCI power corresponding to the complex signals $Z_m$. The selection unit 254 selects the complex signal with the minimum CCI power as a better complex signal $Z_{opt}$. The CCI reconstruction and cancellation unit 256 receives the better complex signal $Z_{opt}$ from the selection unit 254 to perform interference reconstruction and cancellation operations on the better complex signal $Z_{opt}$. The one-tap equalizer 258 compensates the channel effect of the interference-reconstructed-and-cancelled better complex signal, by way of multiplying inverse of the diagonal elements of the channel matrix, to obtain the detected data $\hat{X}$.

Figure 3:
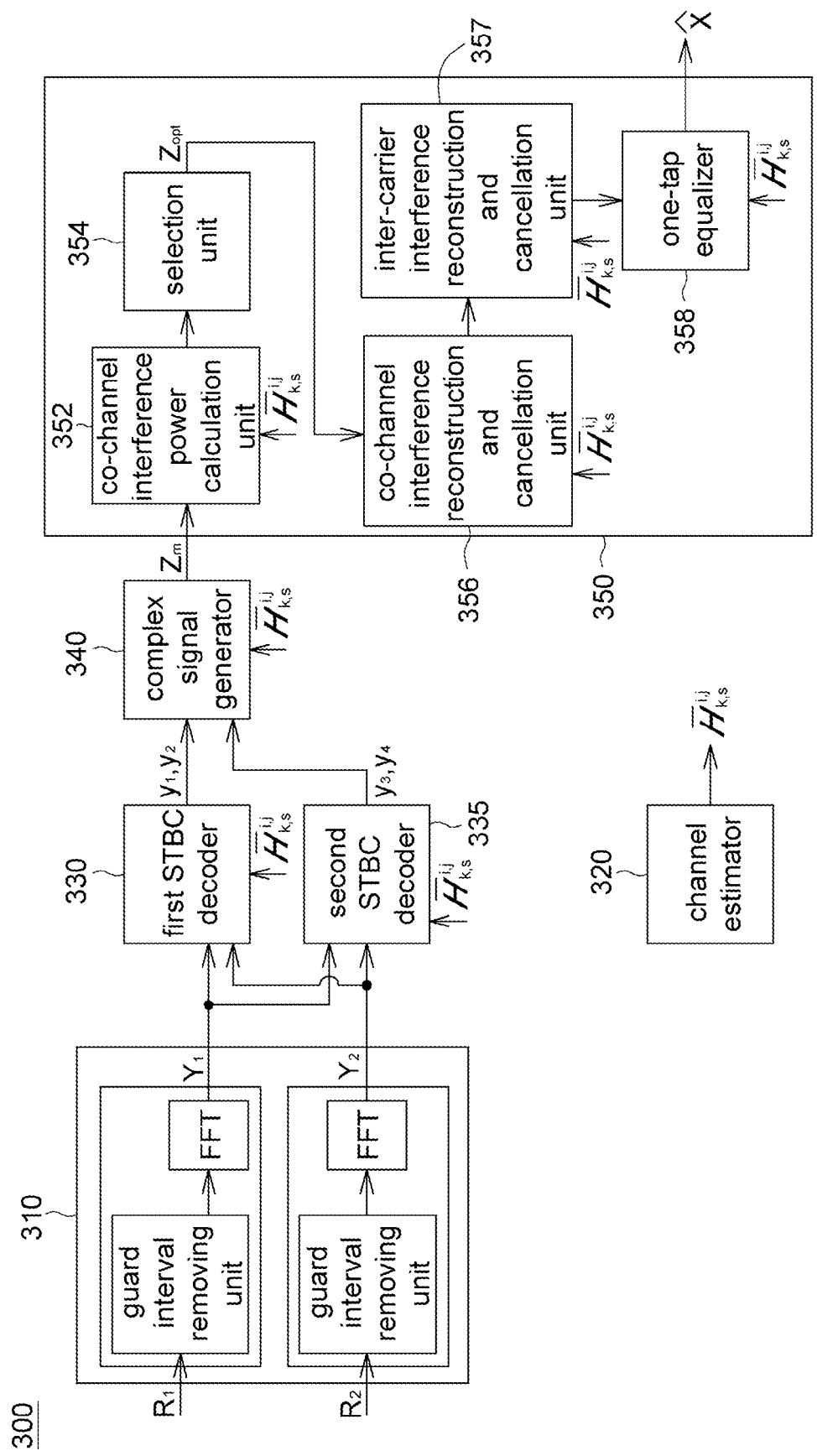
FIG. 3 shows a block diagram illustrating another example of a MIMO OFDM receiver applying the one-tap equalizer according to the embodiment.

Furthermore, the interference cancellation and channel equalization unit can further includes a ICI reconstruction and cancellation unit to reconstruct and cancel ICI to achieve better system performance, as shown in FIG. 3, a block diagram illustrating another example of a MIMO OFDM receiver applying the one-tap equalizer according to the embodiment is illustrated. Compared with the MIMO OFDM receiver 200 in FIG. 2, the interference cancellation and channel equalization unit 350 of the MIMO OFDM receiver 300 further includes a ICI reconstruction and cancellation unit 357 coupled between a CCI reconstruction and cancellation unit 356 and a one-tap equalizer 358. The ICI reconstruction and cancellation unit 357 receives the better complex signal processed by the CCI reconstruction and cancellation unit 356, and performs ICI reconstruction and cancellation operations on the processed better complex signal and then transmits the ICI-interference-reconstructed-and-cancelled better complex signal to the one-tap equalizer 358 to compensate the channel effect to obtain the detected data $\hat{X}$.

Figure 4:
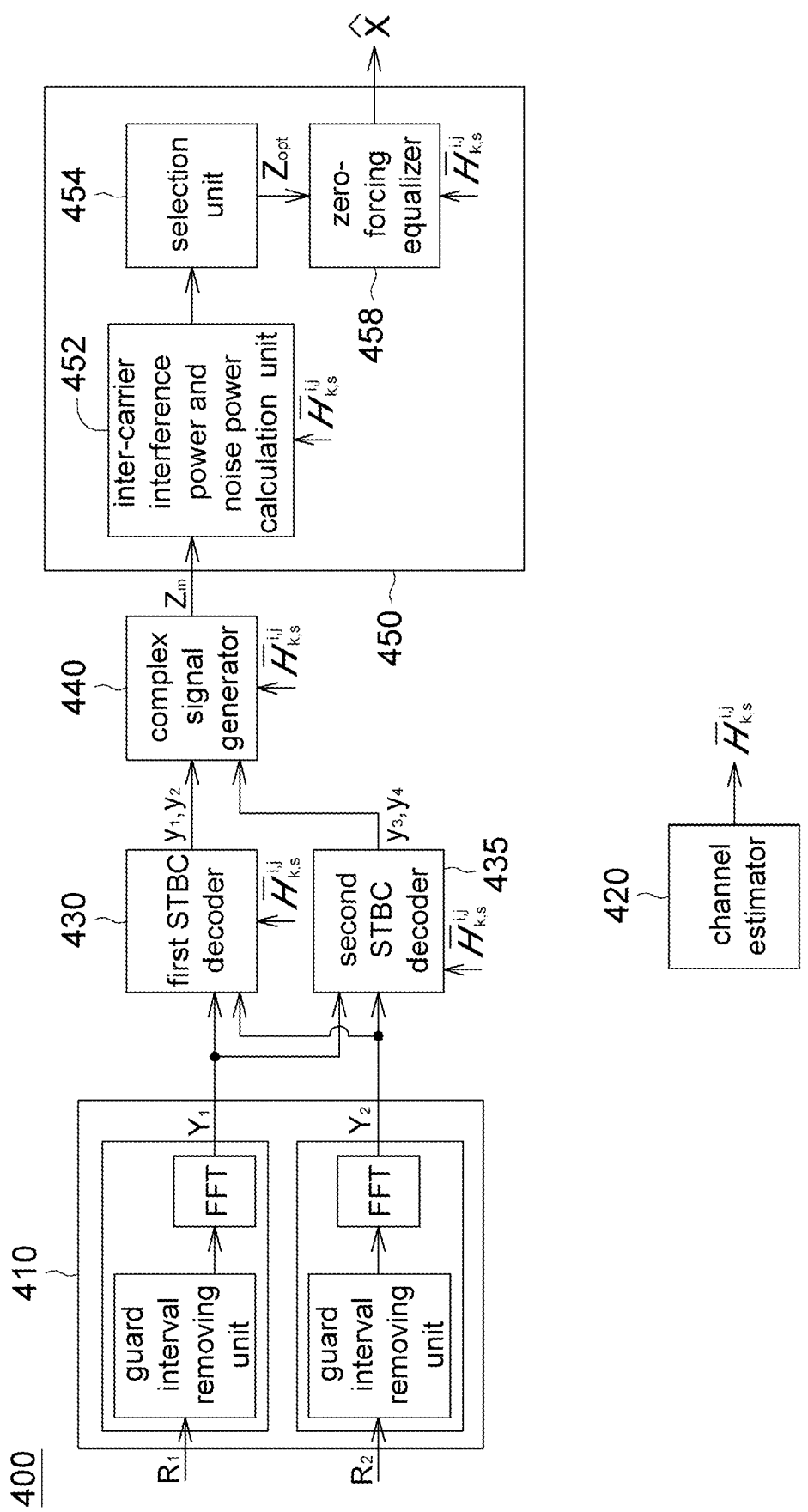
FIG. 4 shows a block diagram illustrating one example of a MIMO OFDM receiver applying a zero-forcing equalizer according to the embodiment.

Take a MIMO OFDM receiver applying a zero-forcing equalizer under a 2×2 STBC OFDM architecture as being exemplified. Referring to FIG. 4, a block diagram illustrating one example of a MIMO OFDM receiver applying a zero-forcing equalizer according to the embodiment is shown. Guard intervals of the time-domain received signals $R_1$~$R_2$ from the two receiving antennas are removed by the demodulation unit 410, and then the frequency-domain received signal $Y_1$ from the first receiving antenna and the frequency-domain received signal $Y_2$ from the second receiving antenna are obtained via Fast Fourier Transform (FFT). The frequency-domain received signal $Y_i$ from the $i^{th}$ receiving antenna is shown as the equation (10), wherein i represents the $i^{th}$ receiving antenna, k represents the $k^{th}$ sub-carrier, and s represents the $s^{th}$ OFDM symbol.

$$Y_i = [Y_{k,s}^i, (Y_{k,s+1}^i)^*]^T \quad (10)$$

where $Y_{k,s}^i = \overline{H}_{k,s}^{i,1} X_{k,s}^1 + \overline{H}_{k,s}^{i,2} X_{k,s}^2 + I_{k,s}^i + W_{k,s}^i$ for k=0~N-1, N is the size of FFT.

In the equation (10), $\overline{H}_{k,s}^{i,j}$ represents the channel response of the $j^{th}$ transmitting antenna to the $i^{th}$ receiving antenna at the $k^{th}$ sub-carrier and the $s^{th}$ OFDM symbol; $X_{k,s}^j$ represents the frequency-domain transmitted signal of the $j^{th}$ transmitting antenna at the $k^{th}$ sub-carrier and the $s^{th}$ OFDM symbol; $I_{k,s}^i$ represents the inter-carrier interference (ICI) of the $i^{th}$ receiving antenna at the $k^{th}$ sub-carrier and the $s^{th}$ OFDM symbol; $W_{k,s}^i$ represents the additive white Gaussian noise of the $i^{th}$ receiving antenna at the $k^{th}$ sub-carrier and the $s^{th}$ OFDM symbol. Each frequency-domain received signal includes an data detection term ($\overline{H}_{k,s}^{i,j} X_{k,s}^j$, i=j), a co-channel interference (CCI) term ($\overline{H}_{k,s}^{i,j} X_{k,s}^j$, i≠j), an inter-carrier interference (ICI) term $I_{k,s}^i$ and an additive white Gaussian noise term $W_{k,s}^i$.

The channel estimator 420 estimates the channel responses $\overline{H}_{k,s}^{i,j}$ corresponding to the frequency-domain received signals $Y_i$ to form corresponding channel response matrices. The first STBC decoder 430 firstly generates corresponding channel response matrices $H_1$~$H_2$ and the frequency-domain received signals $Y_1$~$Y_2$, shown as the equations (11) and (12).

$$Y_1 = H_1 X + I_1 + W_1 \quad (11)$$
where
$$Y_1 = \begin{pmatrix} Y_{k,s}^1 \\ (Y_{k,s+1}^1)^* \end{pmatrix}, H_1 = \begin{pmatrix} \overline{H}_{k,s}^{1,1} & \overline{H}_{k,s}^{1,2} \\ (\overline{H}_{k,s+1}^{1,2})^* & -(\overline{H}_{k,s+1}^{1,1})^* \end{pmatrix},$$
$$X = \begin{pmatrix} X_{k,s}^1 \\ X_{k,s}^2 \end{pmatrix}, I_1 = \begin{pmatrix} I_{k,s}^1 \\ (I_{k,s+1}^1)^* \end{pmatrix}, \text{ and } W_1 = \begin{pmatrix} W_{k,s}^1 \\ (W_{k,s+1}^1)^* \end{pmatrix}$$

$$Y_2 = H_2 X + I_2 + W_2 \quad (12)$$
where
$$Y_2 = \begin{pmatrix} Y_{k,s}^2 \\ (Y_{k,s+1}^2)^* \end{pmatrix}, H_2 = \begin{pmatrix} \overline{H}_{k,s}^{2,1} & \overline{H}_{k,s}^{2,2} \\ (\overline{H}_{k,s+1}^{2,2})^* & -(\overline{H}_{k,s+1}^{2,1})^* \end{pmatrix},$$
$$X = \begin{pmatrix} X_{k,s}^1 \\ X_{k,s}^2 \end{pmatrix}, I_2 = \begin{pmatrix} I_{k,s}^2 \\ (I_{k,s+1}^2)^* \end{pmatrix}, \text{ and } W_2 = \begin{pmatrix} W_{k,s}^2 \\ (W_{k,s+1}^2)^* \end{pmatrix}$$

Then the frequency-domain received signals $Y_1$ and $Y_2$ are respectively combined with corresponding channel response matrices $H_1$ and $H_2$ to obtain multiple original combination signals $y_1$ and $y_2$, as shown in the equations (13) and (14).

$$y_1 = H_1^H Y_1 = H_1^H H_1 X + H_1^H (I_1 + W_1) \quad (13)$$

$$y_2 = H_2^H Y_2 = H_2^H H_2 X + H_2^H (I_2 + W_2) \quad (14)$$

The second STBC decoder 435 firstly rearranges the frequency-domain received signals $Y_1$ and $Y_2$ to obtain rearranged frequency-domain received signals $Y_3$ and $Y_4$ and generates corresponding channel response matrices $H_3$—$H_4$, shown as the equations (15) and (16).

$$Y_3 = H_3 X + I_3 + W_3 \quad (15)$$
where
$$Y_3 = \begin{pmatrix} Y_{k,s}^1 \\ (Y_{k,s+1}^2)^* \end{pmatrix}, H_3 = \begin{pmatrix} \overline{H}_{k,s}^{1,1} & \overline{H}_{k,s}^{1,2} \\ (\overline{H}_{k,s+1}^{2,2})^* & -(\overline{H}_{k,s+1}^{2,1})^* \end{pmatrix},$$
$$X = \begin{pmatrix} X_{k,s}^1 \\ X_{k,s}^2 \end{pmatrix}, I_3 = \begin{pmatrix} I_{k,s}^1 \\ (I_{k,s+1}^2)^* \end{pmatrix}, \text{ and } W_3 = \begin{pmatrix} W_{k,s}^1 \\ (W_{k,s+1}^2)^* \end{pmatrix}$$

$$Y_4 = H_4 X + I_4 + W_4 \quad (16)$$
where
$$Y_4 = \begin{pmatrix} Y_{k,s}^2 \\ (Y_{k,s+1}^1)^* \end{pmatrix}, H_4 = \begin{pmatrix} \overline{H}_{k,s}^{2,1} & \overline{H}_{k,s}^{2,2} \\ (\overline{H}_{k,s+1}^{1,2})^* & -(\overline{H}_{k,s+1}^{1,1})^* \end{pmatrix},$$
$$X = \begin{pmatrix} X_{k,s}^1 \\ X_{k,s}^2 \end{pmatrix}, I_4 = \begin{pmatrix} I_{k,s}^2 \\ (I_{k,s+1}^1)^* \end{pmatrix}, \text{ and } W_4 = \begin{pmatrix} W_{k,s}^2 \\ (W_{k,s+1}^1)^* \end{pmatrix}$$

Then the rearranged frequency-domain received signals $Y_3$ and $Y_4$ are respectively combined with corresponding channel response matrices $H_3$ and $H_4$ to obtain multiple rearrangement combination signals $y_3$ and $y_4$, as shown in the equations (17) and (18).

$$y_3 = H_3^H Y_3 = H_3^H H_3 X + H_3^H (I_3 + W_3) \quad (17)$$

$$y_4 = H_4^H Y_4 = H_4^H H_4 X + H_4^H (I_4 + W_4) \quad (18)$$

The complex signal generator 440 randomly chooses and sums the original combination signals $y_1$ and $y_2$ and the rearrangement combination signals $y_3$ and $y_4$ to obtain multiple complex signals $Z_m$, wherein any number of $y_1$ to $y_4$ may be selected to be summed to obtain multiple complex signals $Z_m$. The interference cancellation and channel equalization unit 450 selects one of the complex signals with the minimum interference to perform interference reconstruction and cancellation operations and channel effect compensation. Due to the interference cancellation and channel equalization unit 450 applies a zero-forcing equalizer, the influence of the CCI term will be equalized by operations of inverse matrices, thus the interference cancellation and channel equalization unit 450 takes the ICI term with the minimum power or the minimum sum of the ICI power and the noise power as the selection rule of the estimating measurement.

As shown in FIG. 4, the interference cancellation and channel equalization unit 450 includes an ICI power and noise power calculation unit 452, a selection unit 454 and a zero-forcing equalizer 458. The ICI power and noise power calculation unit 452 calculates ICI power and noise power corresponding to the complex signals $Z_m$. The selection unit 454 selects the complex signal with the minimum ICI power as a better complex signal $Z_{opt}$. The zero-forcing equalizer 458 compensates the channel effect of the better complex signal selected by the selection unit 454, by way of multiplying inverse matrix of the channel response matrix corresponding to $Z_{opt}$, to obtain the detected data $\hat{X}$. Furthermore, the selection unit 454 may select the complex signal with the minimum sum of ICI power and noise power as the better complex signal to transmit to the zero-forcing equalizer 458 for channel effect compensation to achieve better system performance.

Figure 5:
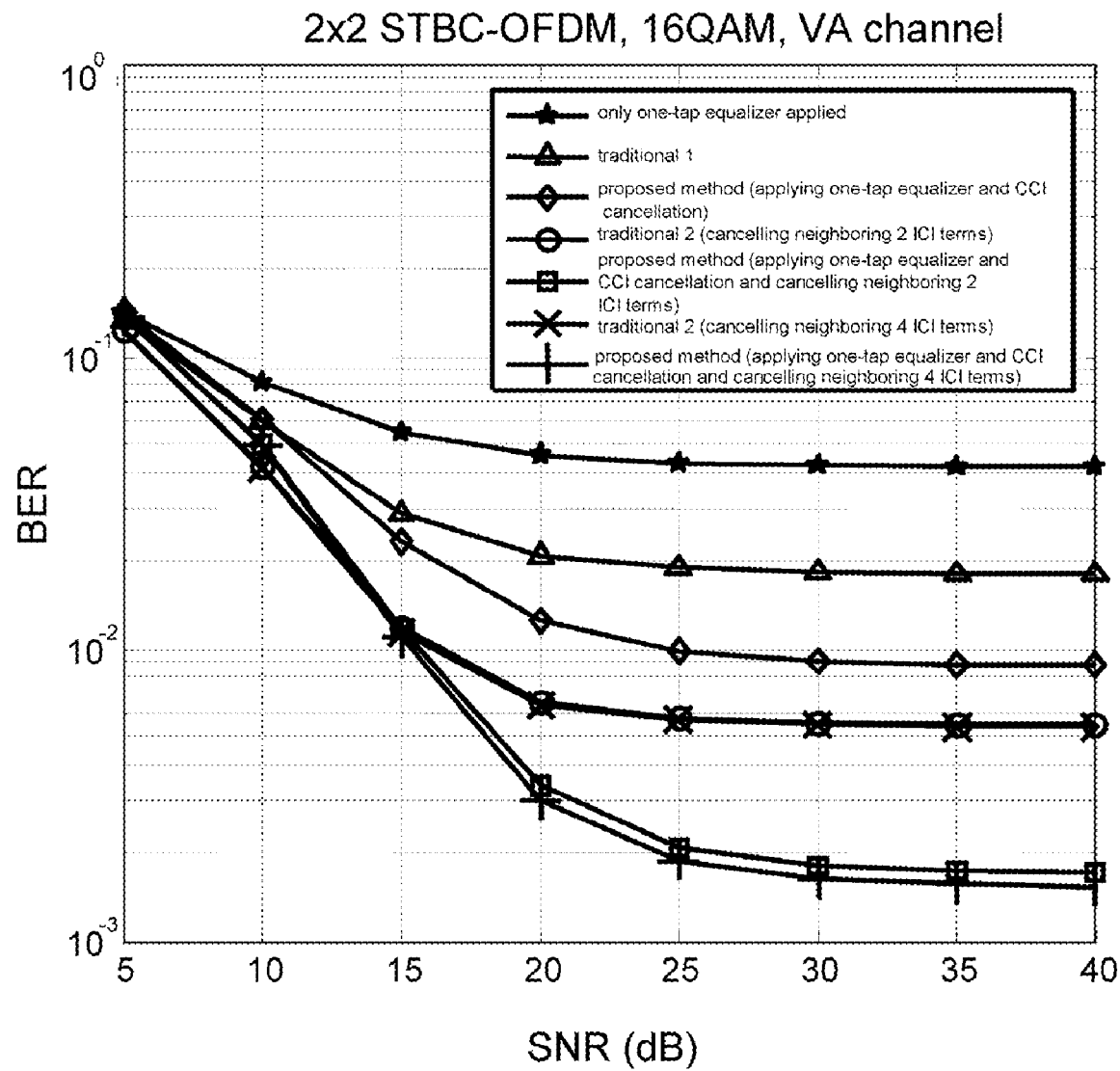
FIGS. 5 and 6 show simulated diagrams showing the performance comparisons among the traditional methods and the proposed MIMO OFDM receiver according to the embodiment of the disclosure.
Figure 6:
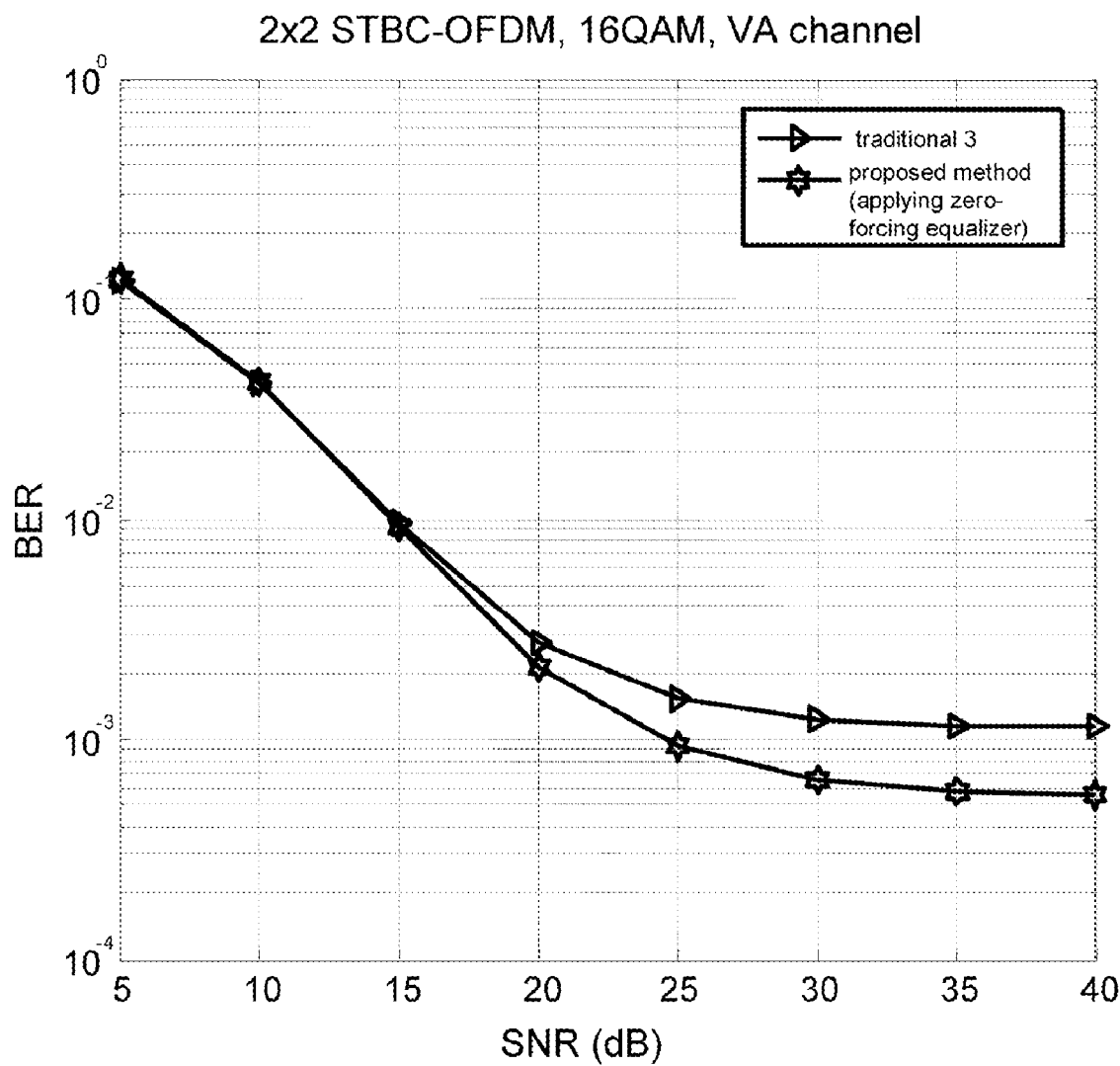

Referring to FIGS. 5 and 6, simulated diagrams showing the performance comparisons among the traditional methods and the proposed MIMO OFDM receiver according to the embodiment of the disclosure are shown. As shown in FIGS. 5 and 6, with respect to the normalized Doppler frequency ($f_d T_u$) of 10.58% in the time-variant vehicle A (VA) channel, it corresponds to the receiver having the motion speed of 500 km/hr and the central carrier frequency of 2.5 GHz under the Wi-Max 802.16e system. It is observed that the system performance of the traditional 1 cannot achieve the requirement based on the comparison basis of bit error rate of $10^{-2}$ before the channel-coding scheme. Moreover, on the comparison basis of bit error rate of $2\times10^{-3}$ before the channel-coding scheme, it is observed that the system performance of the traditional 1 and 2 cannot achieve the requirement, and SNR of the embodiment is better than the traditional 3 by 2.5 dB system performance.

Figure 7:
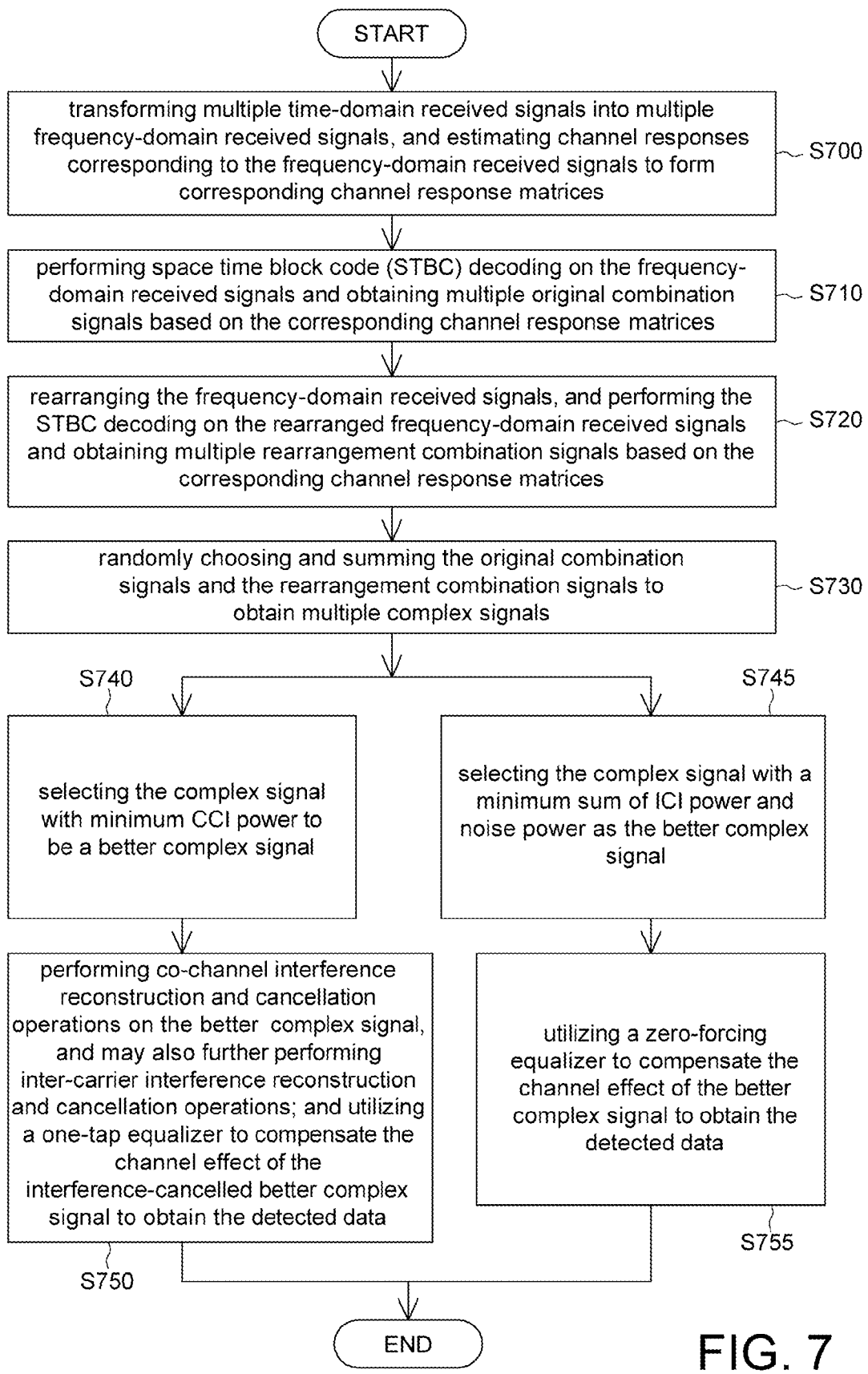
FIG. 7 shows a flow chart of a signal receiving method of the MIMO OFDM receiver according to the embodiment.

Referring to FIG. 7, a flow chart of a signal receiving method of the MIMO OFDM receiver according to the embodiment is shown. In step S700, multiple time-domain received signals are transformed into multiple frequency-domain received signals, and channel responses corresponding to the frequency-domain received signals are estimated to form corresponding channel response matrices. In step S710, STBC decoding is performed on the frequency-domain received signals and multiple original combination signals are obtained based on the corresponding channel response matrices. In step S720, the frequency-domain received signals are rearranged, and STBC decoding is performed on the rearranged frequency-domain received signals and multiple rearrangement combination signals are obtained based on the corresponding channel response matrices. In step S730, the original combination signals and the rearrangement combination signals are randomly chosen and summed to obtain multiple complex signals. In step S740, the complex signal with minimum CCI power is selected as a better complex signal. In step S750, CCI reconstruction and cancellation operations are performed on the better complex signal, and ICI reconstruction and cancellation operations may also be further performed; and a one-tap equalizer is utilized to compensate the channel effect of the interference-cancelled better complex signal to obtain detected data. In addition, it can proceed to step S745 from step S730, the complex signal with a minimum ICI power or a minimum sum of ICI power and noise power is selected as the better complex signal. In step S755, a zero-forcing equalizer is utilized to compensate the channel effect of the complex signal to obtain the detected data. Whether the step S730 proceeds to step S740 or step S745 is determined according to the type of the adopted equalizer.

The detailed principles of the above signal receiving method of the MIMO OFDM receiver have been described in the MIMO OFDM receiver 200, 300 and 400 and related description, so detailed description thereof will be omitted.

The disclosure provides a MIMO OFDM receiver and a signal receiving method thereof. In the STBC OFDM system, STBC decoding is performed on the frequency-domain received signals from multiple receiving antennas to obtain multiple original combination signals, and then the frequency-domain received signals are rearranged and STBC-decoded to obtain multiple rearrangement combination signals. The original combination signals and the rearrangement combination signals are randomly chosen and summed to obtain multiple complex signals, and a better complex signal is found in conjunction with selection rules of different estimating measurements. The interference reconstruction and cancellation operations and channel effect compensation are performed on the better complex signal to obtain detected data. The calculation is simple and the CCI and ICI can be suppressed without losing additional data transmission rate.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A receiver, comprising:
a demodulation unit for transforming a plurality of time-domain received signals into a plurality of frequency-domain received signals;
a channel estimator for estimating channel responses corresponding to the frequency-domain received signals to form corresponding channel response matrices;
a first space time block code (STBC) decoder for performing STBC decoding on the frequency-domain received signals and obtaining a plurality of original combination signals based on the corresponding channel response matrices;
a second STBC decoder for rearranging the frequency-domain received signals, and performing STBC decoding on the rearranged frequency-domain received signals and obtaining a plurality of rearrangement combination signals based on the corresponding channel response matrices;
a complex signal generator for randomly choosing and summing the original combination signals and the rearrangement combination signals to obtain a plurality of complex signals; and
an interference cancellation and channel equalization unit for selecting one of the complex signals to be used to cancel interference and compensate channel effect to obtain detected data.

2. The receiver according to claim 1, wherein the interference cancellation and channel equalization unit comprises:
an inter-carrier interference (ICI) power and noise power calculation unit for calculating ICI power and noise power of the complex signals;
a selection unit for selecting the complex signal with minimum ICI power as a better complex signal; and a zero-forcing equalizer for compensating the channel effect of the better complex signal to obtain the detected data.

3. The receiver according to claim 2, wherein the selection unit further selects the complex signal with a minimum sum of ICI power and noise power as the better complex signal.

4. The receiver according to claim 1, wherein the interference cancellation and channel equalization unit comprises:
   a co-channel interference (CCI) power calculation unit for calculating CCI power of the complex signals;
   a selection unit for selecting the complex signal with minimum CCI power as a better complex signal;
   a CCI reconstruction and cancellation unit for perform interference reconstruction and cancellation operations on the better complex signal; and
   a one-tap equalizer for compensating the channel effect of the interference-reconstructed-and-cancelled better complex signal to obtain the detected data.

5. The receiver according to claim 4, wherein the interference cancellation and channel equalization unit further comprises:
   an ICI reconstruction and cancellation unit for receiving the better complex signal processed by the CCI reconstruction and cancellation unit, and performing ICI reconstruction and cancellation operations on the CCI-processed better complex signal and transmitting the interference-reconstructed-and-cancelled better complex signal to the one-tap equalizer.

6. A signal receiving method of a receiver, comprising:
   transforming a plurality of time-domain received signals into a plurality of frequency-domain received signals, and estimating channel responses corresponding to the frequency-domain received signals to form corresponding channel response matrices;
   performing space time block code (STBC) decoding on the frequency-domain received signals and obtaining a plurality of original combination signals based on the corresponding channel response matrices;
   rearranging the frequency-domain received signals, and performing STBC decoding on the rearranged frequency-domain received signals and obtaining a plurality of rearrangement combination signals based on the corresponding channel response matrices;
   randomly choosing and summing the original combination signals and the rearrangement combination signals to obtain a plurality of complex signals; and
   selecting one of the complex signals to be used to cancel interference and compensate channel effect to obtain detected data.

7. The signal receiving method of a receiver according to claim 6, further comprising:
   calculating inter-carrier interference (ICI) power of the complex signals;
   selecting the complex signal with minimum ICI power as a better complex signal; and
   utilizing a zero-forcing equalizer to compensate the channel effect of the better complex signal to obtain the detected data.

8. The signal receiving method of a receiver according to claim 7, further comprising:
   calculating noise power of the complex signals, and selecting the complex signal with a minimum sum of ICI power and noise power as the better complex signal.

9. The signal receiving method of a receiver according to claim 6, further comprising:
   calculating co-channel interference (CCI) power of the complex signals;
   selecting the complex signal with minimum CCI power as a better complex signal;
   performing CCI interference reconstruction and cancellation operations on the better complex signal; and
   utilizing a one-tap equalizer to compensate the channel effect of the interference-reconstructed-and-cancelled better complex signal to obtain the detected data.

10. The signal receiving method of a receiver according to claim 9, further comprising:
    performing ICI reconstruction and cancellation operations on the better complex signal processed by the CCI reconstruction and cancellation unit, and transmitting the interference-reconstructed-and-cancelled better complex signal to the one-tap equalizer.

* * * * *